United States Patent Office 3,382,157
Patented May 7, 1968

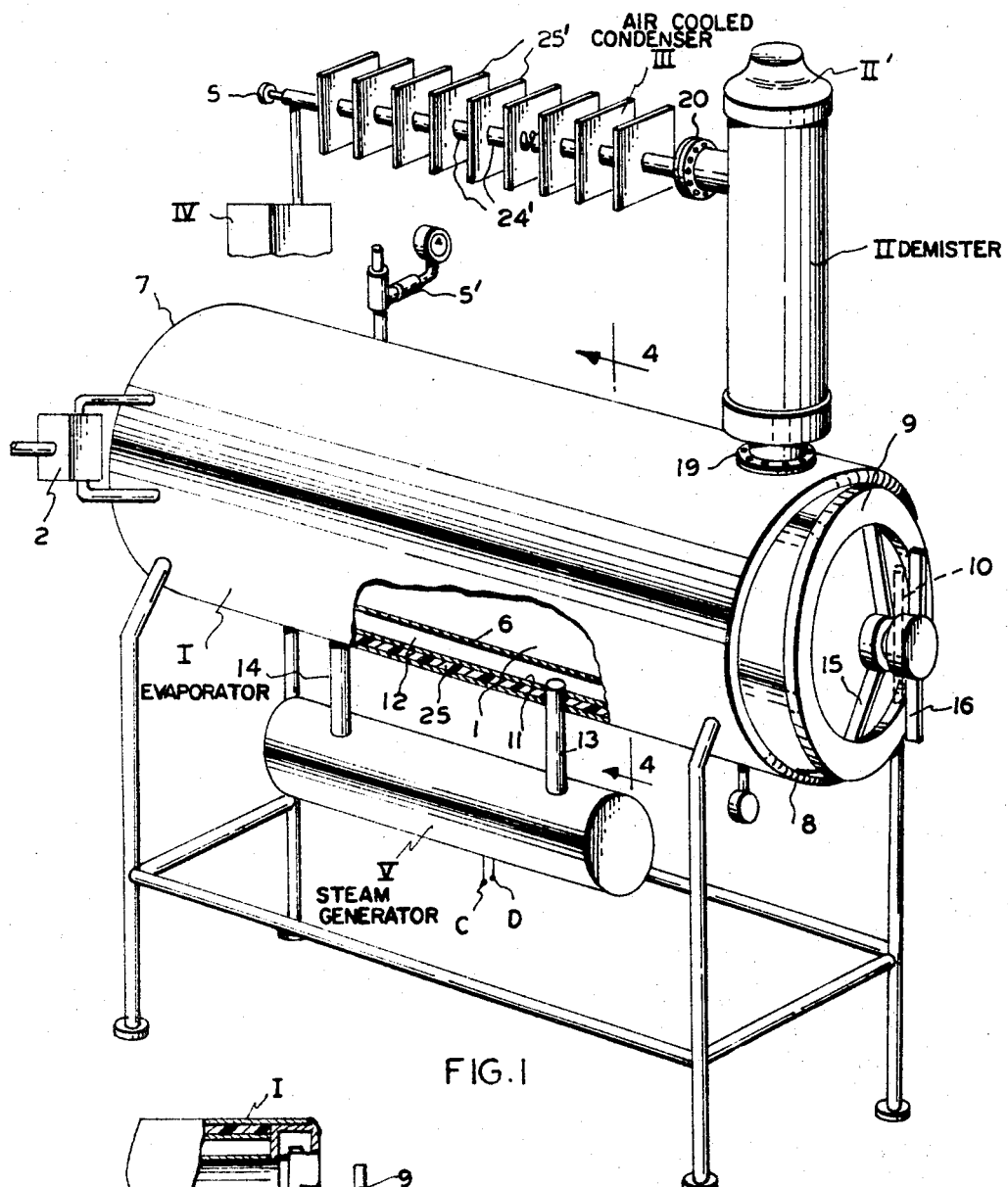
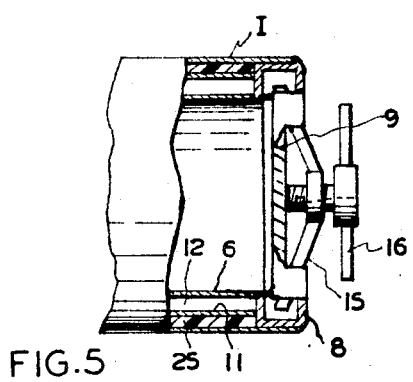
FIG.1
FIG.5
INVENTOR
WILLIAM A. BARNSTEAD
BY Robert Shaw
ATTORNEY May 7, 1968 W. A. BARNSTEAD 3,382,157
STEAM JACKETED CYLINDRICAL WATER STILL WITH
DEMISTER AND ACCESS DOOR
Filed May 18, 1964 2 Sheets-Sheet 2
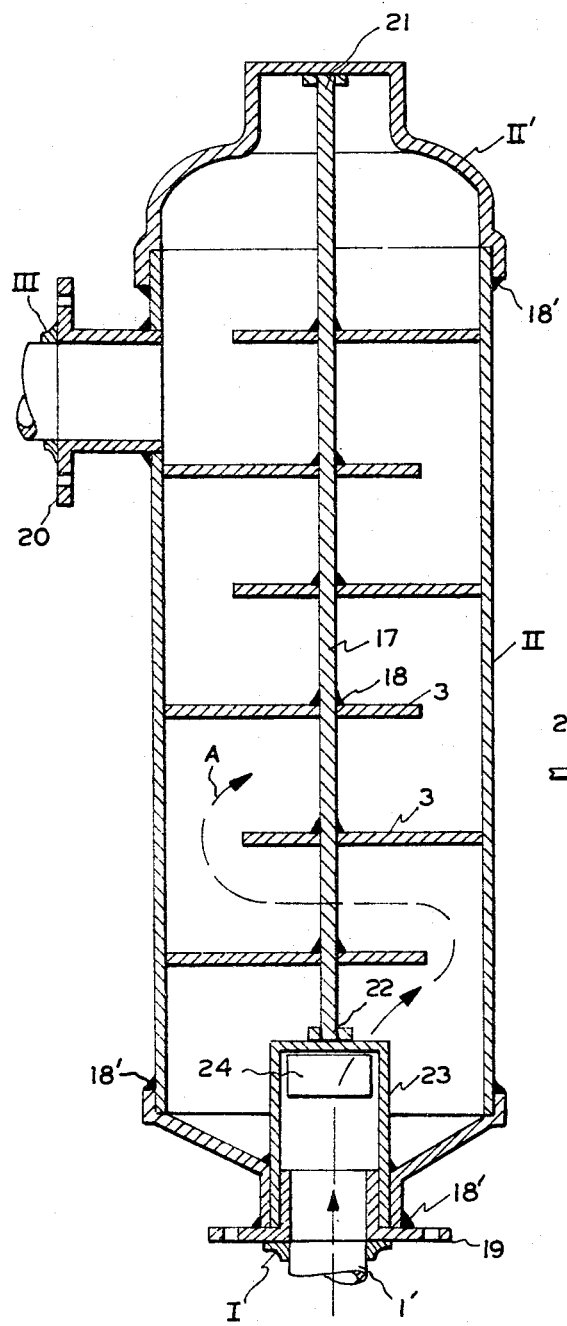
FIG.2
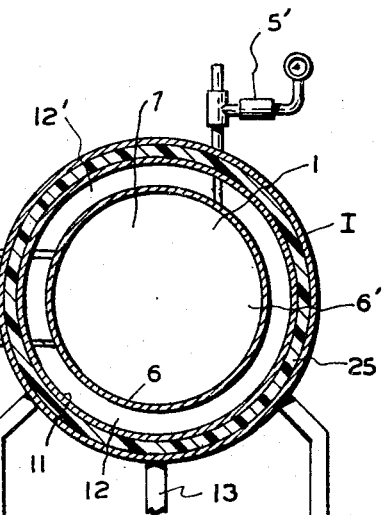
FIG.3
FIG.4
INVENTOR
WILLIAM A. BARNSTEAD
BY Robert Shaw
ATTORNEY

3,382,157
STEAM JACKETED CYLINDRICAL WATER STILL
WITH DEMISTER AND ACCESS DOOR
William A. Barnstead, 311 Appleton St.,
Arlington, Mass. 02174
Filed May 18, 1964, Ser. No. 367,945
3 Claims. (Cl. 202—197)

The present invention relates to water stills adapted to provide high purity distilled water.

High purity water, as the term is used herein, refers to water from which substantially all impurities have been removed. One common method of purifying water is distillation. In the process of distillation, tap water is introduced into an evaporator there to be changed to a water vapor which is subsequently condensed to a liquid thereby to remove unwanted constituents or impurities in the manner discussed, for example, in co-pending application S.N. 280,199, filed May 14, 1963, of the present inventor. In some instances the tap water is passed through resins prior to its introduction to the evaporator. This form of filtration, called ion exchange, removes many of the impurities present in the tap water, but it introduces others, and the impurities thus introduced, including the resins, are particularly undesirable because they do not register on conventional water testing meters, but do cause considerable difficulty when, for example, the distilled water is used to wash transistor parts in the manufacturing of such parts.

In the distillation process, gases and even particles that are not thought of as gaseous in nature, such as, for example, detergents and the like, may be discharged to the atmosphere; however, a large number of impurities remain as a coating on the inner surface of the evaporator and other portions of the still. While the coating is undesirable even on the walls of the evaporator, as more particularly discussed hereinafter, it has greater and more immediate detrimental effect upon the heating elements in the evaporator. Conventional heating elements in the evaporator comprise coils or tubes in various configurations located within the evaporator and in the water to-be purified. The coils or tubes are generally heated by steam, electricity, or gas flames. Upon boiling of the impure water to effect evaporation thereof, a coating immediately begins to form on the coils or tubes. The coating is an insulation of varying nature, depending upon the contaminants, that reduces the heat transfer from the coils or tubes to the water. Since the surface area of the coils is not great, the detrimental result is immediate. The coating not only results in a reduction in efficiency of heat transfer to the water, but it also often leads, eventually, to burnout of the heating elements of the elecric and gas-fired units since the temperature of such elements will eventually exceed the allowable operating value.

In hard water areas a calcium carbonate deposit quickly forms on the heating coils and other surfaces, but even in the so-called soft water areas deposits comprising detergents and other organics and some inorganics build up on the said coils, and, also, on the walls of the evaporator, on baffles in the baffle section and on surfaces within the condenser. It has been found, moreover, that these latter deposits are the source of problems also. This is because upon the formation of a complete coating within the evaporator and pipes to the baffle section and thence to the condenser, it has been discovered that water will pass by capillary action through this coating, as a liquid, from the evaporator to the condenser without ever having become a vapor. The liquid carries with it contaminants from the impure water, which contaminants would usually be removed by the distillation process, as well as materials dissolved from the coating by water passing therethrough. Furthermore, in many instances, the vapor itself scrubs the coating near the entrance to the condenser and carries the same into the condenser and, then, into the distillate.

It has been found that the coating begins to accumulate at the lowermost surfaces of the evaporator and it appears to grow toward the uppermost surfaces in a gradual creeping fashion, as the still is operated, until all of the inner surfaces are eventually covered. In the conventional still the unit must be wholly dismantled to effect complete cleaning and in some instances, as a matter of fact, portions of the still must be replaced. Replacement of the heat transfer sections, for example, of the gas-fired and some electrically heated stills, which are impossible to clean, is almost always required.

It is, accordingly, an object of the present invention to provide a water still that shall not be subject to the before-mentioned disadvantages; one whose operation is, rather, not affected by residue from water in the evaporator to the extent that such residue affects present stills.

Another object of the present invention is to provide a water still that is receptive to facile cleaning of the active elements thereof.

Other and further objects will be apparent in the description to follow and will be delineated in the appended claims.

Generally, and by way of summary, the objects of the invention are attained in a water still having, in combination, an evaporator comprising a chamber to receive feed water containing impurities to be removed therefrom; the chamber is defined by an inner wall, and an outer wall is disposed outward from the inner wall to define a closed space therebetween. An inlet to the space enables the injection of a hot fluid, as steam, thereinto, heat from the fluid passing through the inner wall to change the water to a water vapor containing droplets and often entrained particles, solid impurities present in the feedwater remaining as deposits on the inner chamber surface; a baffle section may be provided to receive the water vapor to separate the water droplets and particles therefrom, and a condenser is provided to change the water vapor to a distillate. Access means, illustrated herein as a hinged door, is provided to the said chamber, said access means being easily removable to enable facile removal of the deposits from the chamber.

The invention will now be described with reference to the enclosed drawing, FIG. 1 of which is an isometric view, partially cut away, of a water still apparatus embodying the inventive concept herein described;

FIG. 2 is a partial view on an enlarged scale in section showing details of a baffle section;

FIG. 3 is a plan view on an enlarged scale of a baffle of the baffle section;

FIG. 4 is a cross-section view taken upon the line 4—4 in FIG. 1, looking in the direction of the arrows; and FIG. 5 is a fragmentary view, partially cutaway, showing details of a door at the right side of the still of FIG. 1.

The water still described in the said co-pending application contains a heat transfer system in which the heating elements are immersed in the water in the evaporator section. This general type heating system is conventional and is found in one form or another in most of the water stills in use today. The source of heat energy may be electricity and the coils immersed in the water in the chamber are insulated, high resistance, electric elements. The coils may, on the other hand, be tubular, to receive high temperature steam; or the source of energy may be a gas or an oil burner wherein heat is transferred to a heat transfer section usually located in the lower portion of the evaporator section.

Regardless of which of the above-mentioned conventional heat transfer apparatus is used, the heat transfer area is relatively small and the temperature of the heating elements is high as compared to the apparatus to be hereinafter described. Any impairment of the heat transfer characteristic between the heater elements and the water is magnified because the transfer area is so small. Additionally, the configuration and location of heating elements is such that it is difficult, if not impossible, to clean them by ordinary maintenance means. Indeed, the tubes of gas or oil-fired units cannot be cleaned, but must be replaced, at great expense, as before mentioned.

The apparatus of the present invention, however, contemplates a large heat transfer area that is readily accessible for cleaning. It has been found that the large area and, thus, lower temperature, results in a lesser tendency for deposits to adhere to the heating surface, and the embodiment herein disclosed enables ready cleaning on a daily basis, if necessary, of the heat-transfer surface.

The discussion herein has related mainly to the cleaning of the heating elements. However, in conventional apparatus, the evaporator chamber itself must be cleaned frequently, and this cleaning requires a virtual dismantling of the complete apparatus; whereas, in the apparatus of the present invention, the chamber surface and the heat-transfer surface, which are one and the same, may be cleaned merely by opening a door that permits ready access to the chamber.

It is now in order to discuss the present apparatus in detail with reference to FIG. 1. Briefly, the still comprises an evaporator section I that receives tap water to-be-purified (hereinafter sometimes called feedwater) into a chamber 1 thereof through a metering valve 2. The feedwater contains particles such as carbonates and the like, detergents and other organics, gases and other impurities. Heat is applied to the feedwater contained in the chamber 1, in a manner to be later discussed, changing it to a water vapor containing, among other things, water droplets and entrained particles. The vapor passes upward through a passage, shown at 1' in FIG. 2, from the chamber 1 to an elongate baffle section II wherein the water droplets and entrained particles are removed therefrom as the vapor passes in a serpentine path, shown in part by the arrow A in FIG. 2, around baffles 3, passing from the baffle section to a condenser III wherein the vapor is changed to a liquid and the distillate thus formed drains to a storage means IV. An adjustable vent 5 enables the maintenance of a pressure in the system comprising the evaporator, the baffle section and the condenser for purposes discussed in the said co-pending application.

The cylindrical-shaped chamber 1 illustrated is defined by a cylindrical inner wall 6, one end of the cylinder, shown at 7, being closed by an integral saucer-shaped member 6' and the other end, shown at 8, having a door 9 hingedly attached at 10 to the evaporator I to allow easy access to the chamber 1 for purposes to be discussed hereinafter. A cylindrical outer wall 11 is coaxially disposed outward from the inner wall 6 to define a cylindrical-shaped space or cavity 12 therebetween, the space 12 being closed at each end by annular members one of which is shown at 12' in FIG. 4. Steam from a steam generator V passes upward through inlet pipes 13 and 14 to the space 12. The steam generator V shown comprises a container having electric heating elements, not shown. The steam system is closed and comprises the generator V, the pipes 13 and 14 and the closed space 12. Initially the steam generator system may be charged with distilled water and thereafter only small amounts of make-up water are needed so that coating of the active elements is no problem. Steam passes up through either or both of the pipes 13 and 14 and condenses in the space 12, passing back as a liquid to the generator V through either or both of the pipes 13 and 14. Electric power to the said generator may be supplied at electrical terminals C and D. Other sources of energy may also be used as, for example, gas or oil; or the inlet pipes 13 and 14 may be connected to a remote steam generating system.

Heat from the steam in the space 12 passes through the inner wall 6 by conduction to the feedwater in the chamber 1 (an insulating layer 25 prevents heat loss), changing the feedwater to a water vapor, as before discussed. While the gases and some entrained solids, detergents and the like, pass upward to the baffle section II, a large percentage of the solids remain as deposits on the surface of the chamber 1. In conventional stills the evaporator is dismantled periodically to enable removal of these deposits. This dismantling is a time consuming operation so that it is done only weekly, monthly or, in some instances, even longer periods elapse between cleanings. Substantial deposits form in the evaporation chamber during these periods. In addition, as before mentioned, the deposits also build up on the heating elements reducing their efficiency measurably and these latter deposits are most difficult to remove.

The present invention, however, enables the cleaning of the evaporator chamber 1 on a daily basis. This may be easily effected by unlatching the door 9 and opening the same. The deposits may be removed by the use of an arcuate scraper or other suitable means. Since the time between cleanings may be short, the deposits do not have the tendency to harden as is often the case. The door 9 is latched by a plurality of rods 15, as shown in FIG. 5, that move radially in response to rotation of a handle 16 to pass into an annular groove in the periphery of the end 8 of the evaporator I.

The water vapor passing to the baffle section, as previously mentioned, contains entrained particles. These particle drop back to the chamber 1 or secure themselves to the walls of the baffle section II, or to the plurality of baffles 3. These baffles 3, shown in FIG. 3, are substantially the same shape as the cross section of the baffle section II, but each has a cutaway portion, shown at 3'. The baffles 3 are disposed in the baffle section II with the cutaway 3' of adjacent baffle being located at opposite sides of the baffle section to form the serpentine path before mentioned. The baffles are soldered at 18 to a rod 17, the assembly being removable vertically as a unit merely by removal of the top II' of the said baffle section or the baffle section may be completely disassembled by melting solder joints 18'. It has been found advantageous periodically to replace the said assembly since deposits do lead to the wick or capillary action, before discussed, whereby water may pass from the evaporator, upward through the baffle section to the condenser by such capillary action without ever having been changed to a vapor.

The illustrated baffle section II is flange mounted by flanges 19 and 20 to the evaporator I and condenser III, respectively, so that it may be removed as a unit and returned to the manufacturer for rebuilding. The rod 17 is oriented along the long dimension of the said baffle section and secured at the upper and lower ends thereof by annular studs 21 and 22, respectively. The stud 22 is attached to a disengaging shell member 23 which serves the further purpose of receiving the said water vapor from the chamber 1, the vapor passing upward from the chamber 1 through the member 23 and out two openings 24 in the wall of the member 23, only one of which openings is shown in FIG. 2.

The illustrated condenser III comprises an elongated tube 24' to receive the water vapor from the baffle section II, heat from the vapor being removed through a plurality of fins 25' secured at intervals along the said tube. It has been found that the type of condenser illustrated, in addition to the obvious advantage of conserving cooling water, has the further advantage of presenting a reasonably large cooling area to the water vapor. Whereas, in the water-cooled condenser of the said co-pending application, a fairly small but low temperature cooling surface is presented to the vapor, in the condenser III a large surface is presented and the temperature of the cooling surface may, in many instances, be near to room temperature. It has been found that the larger cooling surface and consequent lower temperature differential results in a larger portion of the unwanted gases (see discussion of the gas content of the water vapor in the said co-pending application) remaining in the gaseous state; whereas localized cooling in the water cooled condenser results in uneven cooling of the water vapor and an inordinate amount of unwanted gases pass into solution.

The gas pressure within the still is controlled by the adjustable valve 5 before mentioned, and a combination relief valve and pressure indicator 5' is connected into the chamber 1 for safety purposes and to provide chamber pressure readings.

A blower (or a plurality of blowers) may be provided to effect additional cooling should this be needed.

In a water still of conventional design the capacity of the still is for the most part an inflexible constant. However, the present still may be made to provide a lesser or greater amount of distillate by changing the water level in the evaporator I and, in fact, an optimum condition may be found by moving the water level up or down, thus changing the heat exchange surface presented by the inner shell member to the water in the chamber 1. In addition, small changes in the pressure and temperature of the steam introduced into the space 12 result in substantial changes in the evaporation rate within the chamber 1.

Modifications of the invention will occur to persons skilled in the art and all such modifications are considered to fall within the spirit and scope of the invention as defined in the appended claims.

What is claimed is:

1. A water still having, in combination, an evaporator comprising a chamber to receive feedwater containing impurities to be removed therefrom, the chamber being defined by an inner wall, an outer wall disposed outward from the inner wall to define a space therebetween, an inlet to the space to enable the injection of a hot fluid thereinto, heat from the fluid passing through the inner wall to change the water to a water vapor containing water droplets and entrained particles, solid impurities remaining as deposits on the chamber surface, an elongate baffle section to receive the vapor to separate the water droplets and particles therefrom, a condenser to receive the water vapor from the baffle section to change it to a distillate, and access means to the chamber, the said access means being easily removable to enable facile removal of the deposits in the chamber, the baffle section having a removable baffle assembly comprising a rod disposed along the long dimension of the elongate baffle section and a plurality of baffles parallely disposed along the rod, the baffles each having a cutaway portion and the cutaway portion of adjacently located baffles being disposed at opposite sides of the said rod to provide a serpentine path for the vapor.

2. A water still as claimed in claim 1 and in which the baffle section is flange mounted to the evaportor and to the condenser to enable easy separation thereof.

3. A water still having, in combination, a cylindrical evaporator supported with its longitudinal axis disposed substantially horizontal, said evaporator having an inner cylindrical shell member and an outer cylindrical shell member coaxially disposed about the inner shell member and separated therefrom to define a space therebetween, one end of the inner shell member being closed and both ends of the space between the two members being closed, said evaporator having a door hingedly supported to close the other end of the inner shell member, said door being adapted to be opened to provide access to the interior of the inner shell member and having a releasable latch for holding it closed, means for supplying a body of water supported upon the bottom of the cylindrical wall of said inner shell member, the said space between said shell members having means to receive and exhaust a high temperature fluid therein for heating the water contained in said inner shell member by conduction only and to change the water to vapor, the cylindrical wall of said inner shell member providing a large heat transfer area for substantially uniform heating of the water supported thereon, and a condenser having means for supporting it on said evaporator adjacent to the top thereof and being connected to said inner shell member adjacent to the top thereof to receive the vapor and change it to a liquid, the cross-dimensions of said other end of said inner shell member being substantially as great as the full cross-dimensions of said inner shell member, said door having cross-dimensions at least substantially as greater as the cross-dimensions of said inner shell member whereby said door provides ready and full access to the interior of said inner shell member for frequent cleaning.

References Cited

UNITED STATES PATENTS

| | | | |
|---|---|---|---|
| 1,086,432 | 2/1914 | Zinkeisen et al. | 202—233 X |
| 3,163,587 | 12/1964 | Champe | 202—197 |
| 3,248,305 | 4/1966 | Williamson | 202—197 |
| 2,649,408 | 8/1953 | Williamson et al. | 203—7 |
| 2,558,933 | 7/1951 | Cross | 202—181 |
| 52,476 | 1866 | Wheeler | 202—167 |
| 374,078 | 11/1887 | Mathieu | 202—197 |
| 823,488 | 6/1906 | Barnstead | 203—10 |
| 1,516,314 | 11/1924 | Sebald | 202—198 |
| 1,666,777 | 4/1928 | Forbes | 203—11 |
| 2,490,659 | 12/1949 | Snyder | 202—174 |
| 2,554,546 | 5/1951 | Zahm | 15—56 |
| 2,842,224 | 7/1958 | Mooradian | 202—197 |
| 2,971,897 | 2/1961 | Chapman | 202—174 |

NORMAN YUDKOFF, *Primary Examiner.*

F. E. DRUMMOND, *Assistant Examiner.*